United States Patent
Siow et al.

(10) Patent No.: US 6,301,590 B1
(45) Date of Patent: *Oct. 9, 2001

(54) METHOD AND APPARATUS FOR FORMATTING AND DISPLAYING DATA FROM THE INTERNET

(75) Inventors: Tow-Ming Siow, Cupertino; David C. Lai, Fremont; Jia-Bao Chu, San Jose, all of CA (US)

(73) Assignee: Viador, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,204

(22) Filed: Aug. 11, 1997

(51) Int. Cl.[7] .................................................. G06F 17/30
(52) U.S. Cl. ........................... 707/500; 707/503; 707/513
(58) Field of Search ..................... 707/500, 104, 707/513, 517, 9, 3, 10, 516; 395/200.3, 200.31, 200.33, 200.53, 200.8, 200.59; 709/200–232

(56) References Cited

U.S. PATENT DOCUMENTS

| | | | |
|---|---|---|---|
| 5,862,325 | * | 1/1999 | Reed et al. ........................ 395/200.31 |
| 5,864,871 | * | 1/1999 | Kitain et al. ........................... 707/104 |
| 5,913,920 | * | 6/1999 | Adams et al. ......................... 709/204 |
| 6,047,296 | * | 6/1999 | Wilmott et al. ....................... 707/513 |

* cited by examiner

Primary Examiner—Hosain T. Alam
Assistant Examiner—Alford W. Kindred
(74) Attorney, Agent, or Firm—Blakely, Sokoloff, Taylor & Zafman

(57) ABSTRACT

A method and apparatus are used to format and display data on the Web. A request is received on an application server from a Web client, a connection is established to a data repository via the application server, the data is retrieved from the data repository, formatted on the application server in a predetermined reporting format, and displayed on a display device coupled to the Web client.

12 Claims, 17 Drawing Sheets

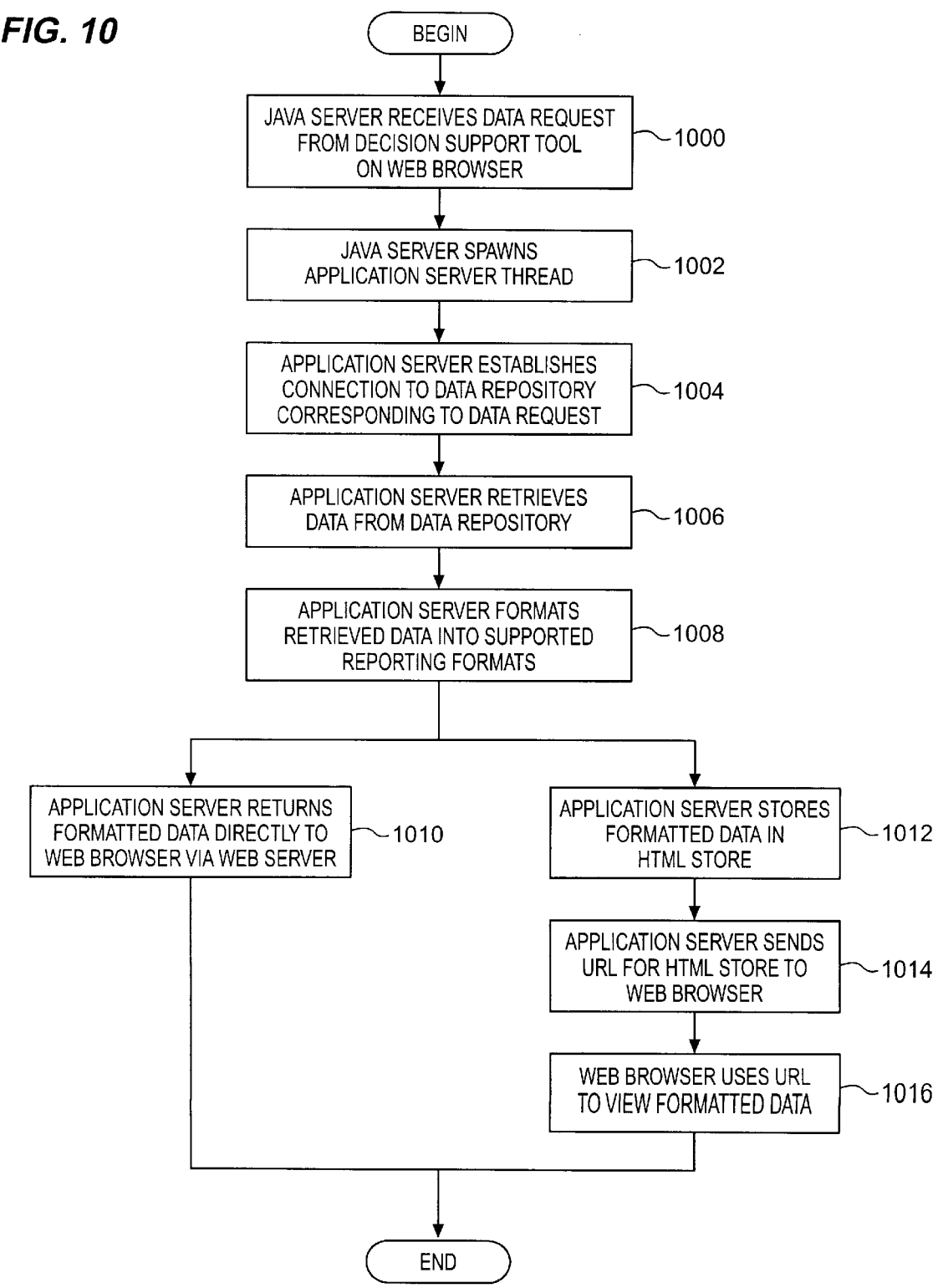

METHOD AND APPARATUS FOR FORMATTING AND DISPLAYING DATA FROM THE INTERNET

FIELD OF THE INVENTION

The present invention relates to the field of Internet technology. Specifically, the present invention relates to a method and apparatus for formatting and displaying data from the Internet.

DESCRIPTION OF RELATED ART

The World Wide Web (the Web) has experienced dramatic growth in recent years. The Web represents all of the computers on the Internet that offer users access to information on the Internet via interactive documents or Web pages. These Web pages contain hypertext links that are used to connect any combination of graphics, audio, video and text, in a no-linear, non-sequential manner. Hypertext links are created using a special software language known as HyperText Mark-Up Language (HTML).

Once created, Web pages reside on the Web, on Web servers or Web sites. A Web site can contain numerous Web pages. Web client machines running Web browsers can access these Web pages at Web sites via a communications protocol known as HyperText Transport Protocol (HTTP). Web browsers are software interfaces that run on Web clients to allow access to Web sites via a simple user interface. A Web browser allows a Web client to request a particular Web page from a Web site by specifying a Uniform Resource Locator (URL). A URL is a Web address that identifies the Web page and its location on the Web. When the appropriate Web site receives the URL, the Web page corresponding to the requested URL is located, and if required, HTML output is generated. The HTML output is then sent via HTTP to the client for formatting on the client's screen.

One reason for the dramatic growth of the Web is the evolution of Web architecture and tools. These advances have enabled users to more fully exploit the Web's capabilities, thus attracting more product vendors and corporations to the Web in the hopes of expanding their customer base. FIGS. 1A–1B illustrate an overview of the evolution of Web architecture in recent years.

As illustrated in FIG. 1A, in early Web architecture, Web browser 100 is coupled to Web server 105 and data repository 110 via the Internet. This architecture provided basic file distribution services, where reports and documents were saved as HTML files on the Web server. The data repositories were originally part of the machine on which Web server 105 resided. As time evolved, data repositories 110 were decoupled from Web server 105 and were able to reside on separate machines. In either scenario, users running Web browser 100 would access HTML files by clicking on the appropriate URL on a Web page. These HTML files were traditionally static documents that did not allow the users to make changes. Instead, static HTML files only allowed users to view, save or print the documents. Static HTML documents are still accessible on the Web today.

FIG. 1B illustrates the next generation of Web architecture. Specifically, as illustrated, in this next generation architecture, a user using Web browser 100 may still access static HTML documents from Web server 105 and data repository 110. In this scenario, however, scripts 115 are used to support dynamic HTML publishing, i.e. HTML documents are created "on the fly" in response to user requests. Scripts 115 include Common Gateway Interface (CGI) scripts, Netscape Server Application Interface (NSAPI) scripts and Microsoft's Internet Server API (ISAPI) scripts. Each of these is described in further detail below.

CGI scripts provided the early means for dynamic Web page generation. CGI programs or scripts that run on Web servers are typically written in an interpretative language like Perl or shell scripts. These languages are popular because they are easy to debug and manage. CGI can, however, also call existing programs written in a compiled language such as C or C++. The downside to CGI scripts is that CGI scripts spawn operating system processes instead of threads. These scripts therefore tend to use system resources inefficiently and are likely to significantly slow down the machine on which the scripts are running.

As a result of the problems with using CGI scripts, native Web server interfaces such as Netscape's NSAPI and Microsoft's ISAPI have caught on with many developers. Scripts written in NSAPI or ISAPI run as threads within a server operating system, thus providing better performance and scalabilty in large multi-user environments. A disadvantage of using these native Web server APIs, however, is that an application written to NSAPI is not compatible with ISAPI and vice versa. As such, the use of NSAPI and ISAPI scripts dictate the Web server that has to be utilized to enable the scripts. As proprietary APIs, these APIs are also limited in their ability to provide developers with a robust application development environment.

Within the traditional Web environments illustrated in FIGS. 1A and 1B, Web browser 100 and Web server 105 do not maintain a persistent connection. Each time a request is made from Web browser 100, a temporary connection is established between Web browser 100 and Web server 105. This process has to be repeated for every request from Web browser 100 because after each request is satisfied, the connection between Web browser 100 and Web server 105 is dropped. Thus, for example, when a user moves from one Web page on Web server 105 to another Web page, the connection is dropped and reestablished between the first Web page and the second.

This "stateless" connection between Web browser 100 and Web server 105 results in numerous problems for applications running on the Web. For example, in a traditional client-server environment, the client machine may maintain a persistent connection to the server machine for as long as the client machine remains logged on to the server via a particular application. As such, a user is able to retrieve and manipulate data over a client-server connection in an extremely flexible manner. Client-server tools, such as decision support tools, have therefore been able to evolved into robust utilities that users' may utilize to perform complex data analysis.

In contrast, given the stateless connection that exists between Web browser 100 and Web server 105, when a user moves between Web pages, the information pertaining to the previous Web page is lost. There is therefore no persistent information that can be easily maintained between Web pages, thus rendering most decision support tools non-functional in the Web environment. Although theoretically possible for developers to create CGI, NSAPI or ISAPI scripts to perform the same functions as a decision support tool in a client-server environment, the practical reality of creating and maintaining these scripts renders this a non-viable solution. The developer creating the scripts would be forced to script the entire connection, retention of data, and the manipulation of data by the users. This would prove to be a monumental task and may only allow users limited functionality, i.e. that which can be scripted.

Thus, although Web architecture has evolved tremendously over the past few years, the use of the Web is still limited to end users who do not require extremely sophisticated utilities on the Web. There are currently severe limitations on the Web for users who require robust analytical tools such as decision support tools. These users continue to use a client-server environment to fulfill their needs.

SUMMARY OF THE INVENTION

The present invention discloses a method and apparatus for formatting and displaying data on the Web. Specifically, a request is received on an application server from a Web client, a connection is established to a data repository via the application server, the data is retrieved from the data repository, formatted on the application server in a predetermined reporting format, and displayed on a display device coupled to the Web client.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which:

FIG. 10 is a flow chart illustrating an embodiment of the present invention

DESCRIPTION OF THE PREFERRED EMBODIMENT

The present invention relates to method and apparatus for formatting and displaying data on the Web. In the following detailed description, numerous specific details are set forth in order to provide a thorough understanding of the present invention. It will be apparent to one of ordinary skill in the art however, that these specific details need not be used to practice the present invention. In other instances, well known structures, interfaces and processes have not been shown in detail in order not to unnecessarily obscure the present invention.

Figure 1A:
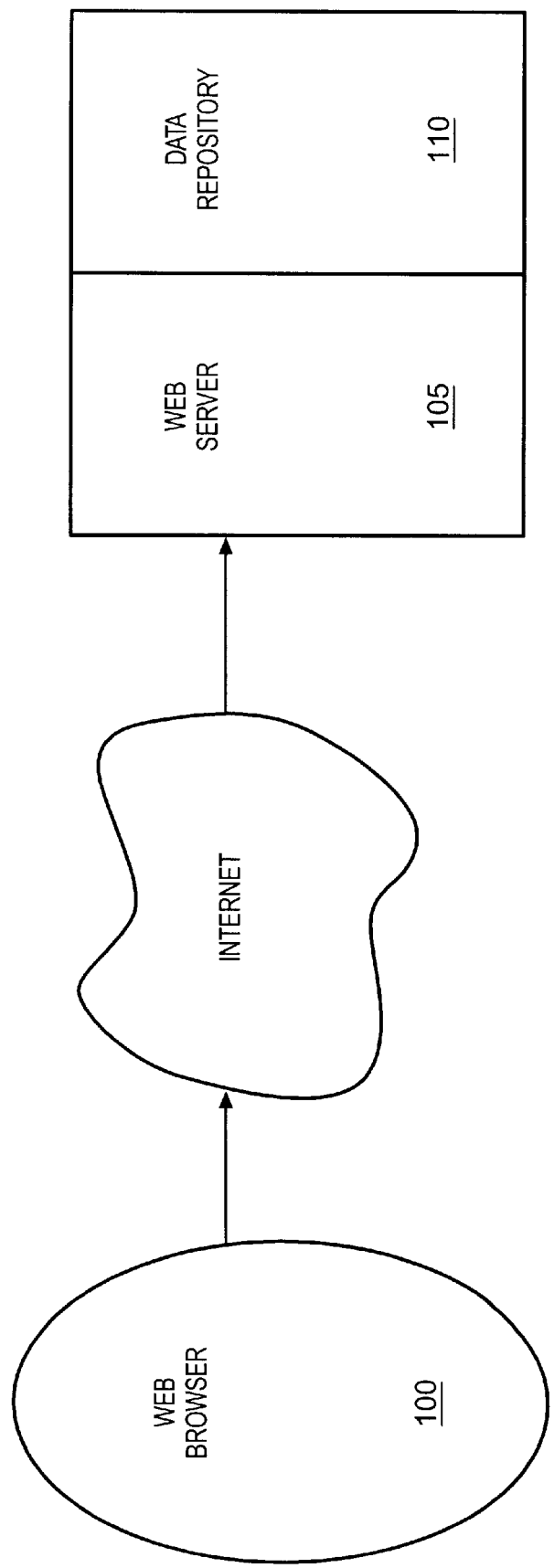
FIGS. 1A–B illustrate an overview of the evolution of Web architecture in recent years
Figure 1B:
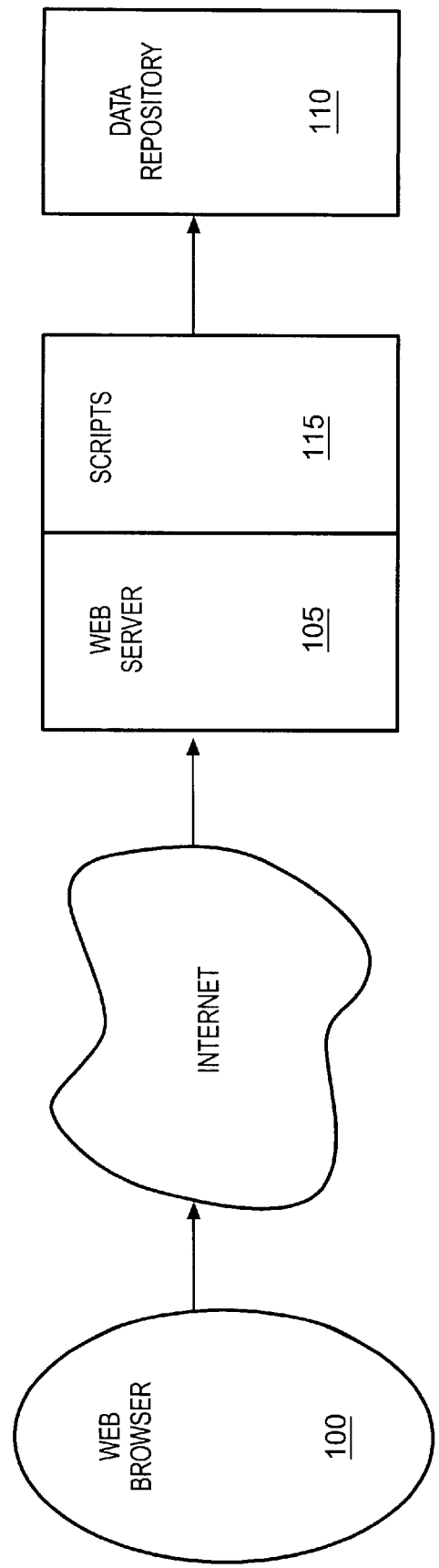
Figure 2:
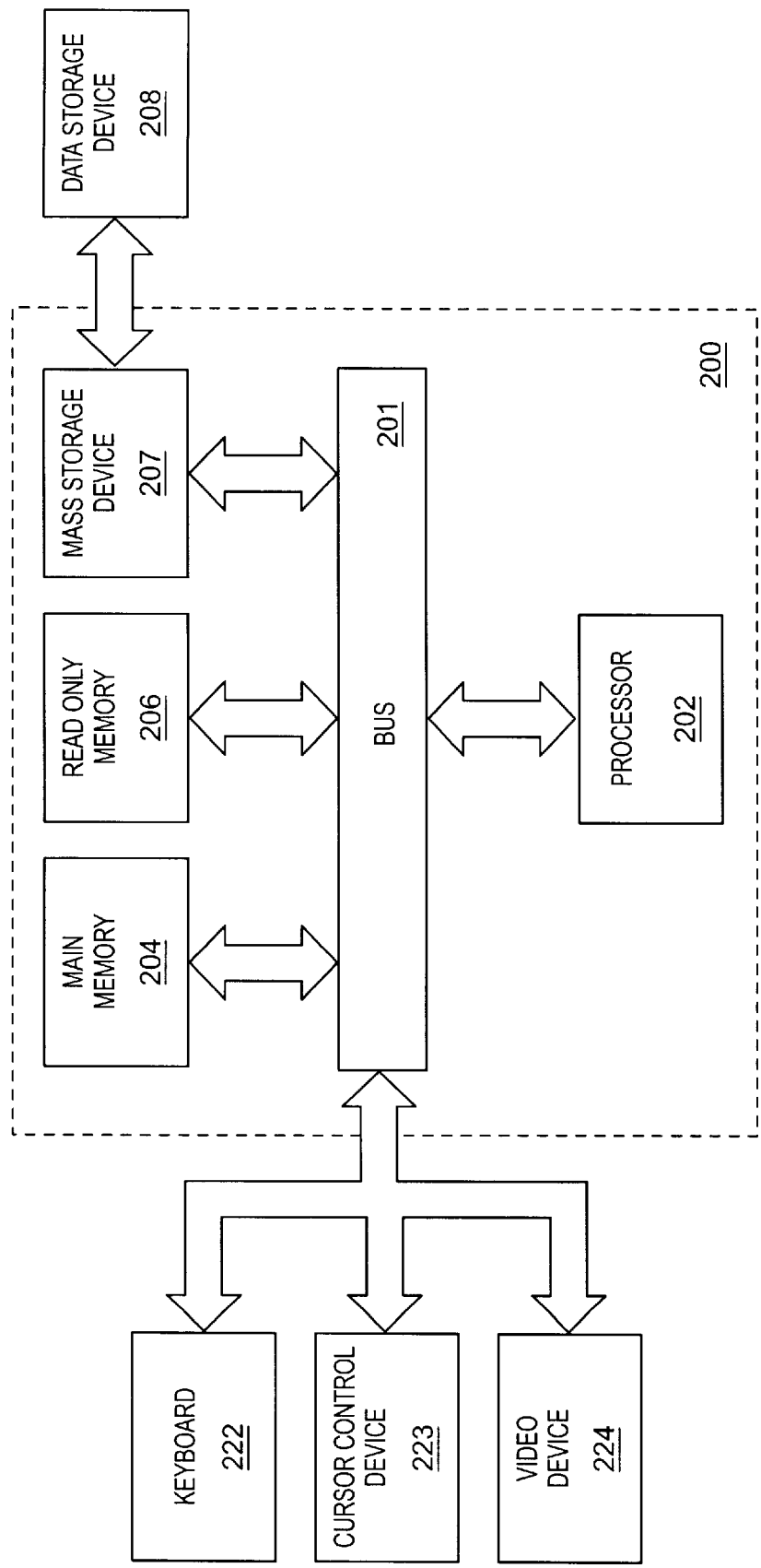
FIG. 2 illustrates a typical computer system 200 in which the present invention operates

FIG. 2 illustrates a typical computer system 200 in which the present invention operates. One embodiment of the present invention is implemented on a personal computer (PC) architecture. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium® processor manufactured by Intel® Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202, then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

Computer system 200 includes a network device 210 for connecting computer system 200 to a network. Network device 210 for connecting computer system 200 to the network includes Ethernet devices, phone jacks and satellite links. It will be apparent to one of ordinary skill in the art that other network devices may also be utilized.

The preferred embodiment of the present invention is implemented as a software module, which may be executed on a computer system such as computer system 200 in a conventional manner. Using well known techniques, the application software of the preferred embodiment is stored on data storage medium 208 and subsequently loaded into and executed within computer system 200. Once initiated, the software of the preferred embodiment operates in the manner described below.

Figure 3:
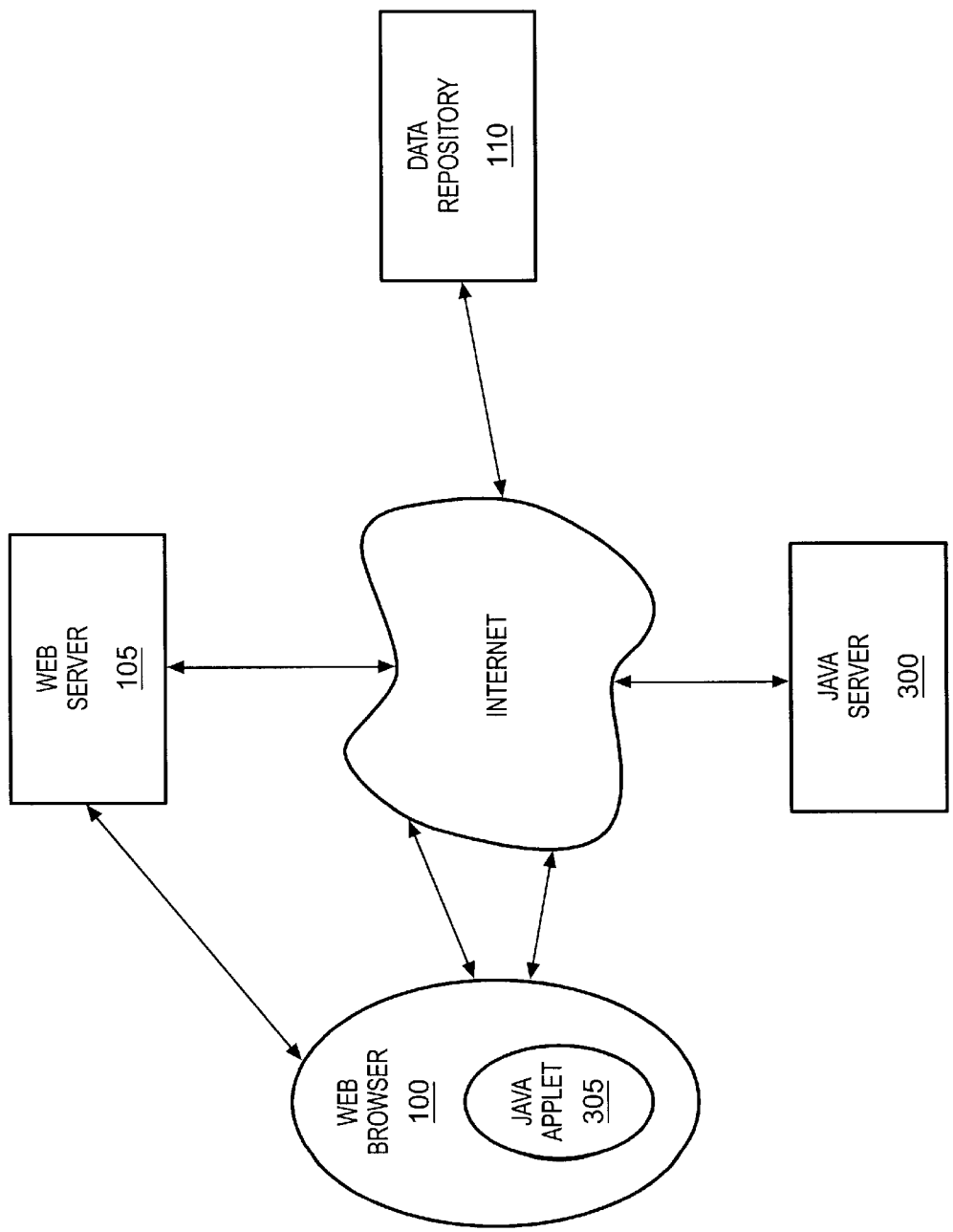
FIG. 3 illustrates an overview of one embodiment of the present invention

FIG. 3 illustrates an overview of one embodiment of the present invention. Specifically, FIG. 3 illustrates a Web architecture that is designed to take advantage of new programming languages such as the Java™ programming language. Java is an object-oriented, high-performance, multi-threaded programming language developed by Sun Microsystems® Java programs that work on Web pages are called "applets." A Java applet is a program designed to be included in an HTML document and run inside a Web browser. Java applets may therefore be used to build dynamic Web pages. Java applications, in contrast with Java applets, are standalone programs that are executed outside of a browser. Although the following description of an embodiment of the present invention is implemented in Java, other technologies such as Microsoft® Corporation's Active-X may also be utilized.

According to the embodiment illustrated in FIG. 3, Web browser 100 still connects via the Internet to Web server 105. Web server 105, however, is not utilized to retrieve data to satisfy requests from Web browser 100. Instead, Web server 105 in this architecture serves mainly to house and download Java applets to Web browser 100. When Web browser 100 connects to Web server 105, Java applet 305 is downloaded to Web browser 100. Web browser 100 then executes Java applet 305 to communicate directly with Java server 300 via any communications protocol appropriate for the Internet. Transaction Control Protocol/Internet Protocol (TCP/IP) is an example of a communications protocol that is commonly used on the Internet. As illustrated in FIG. 3, Web server 105 in this embodiment is not necessary beyond the initial stage of downloading Java applet 305. Note that although Web server 105 is illustrated as residing on a separate machine from Java server 300, Web server 105 and Java server 300 may in fact reside on the same machine. Various Web server and Java server configurations are described in further detail below.

Based on information received from Java applet 305, Java server 300 establishes a connection to data repository 110 and retrieves the data requested by Java applet 305. Java server 300 communicates with data repository 110 via any networking protocols appropriate for the data repository. For example, if data repository 110 is an Oracle7 Server™ from Oracle Corporation®, Java server 300 may communicate with data repository 110 via Oracle's proprietary networking software, SQL* Ne™.

According to this embodiment, the connection between Java applet 305, Java server 300 and data repository 110 is a persistent connection, i.e. a "state" is maintained between Java applet 305 and data repository 110 for the duration of the connection. This connection is therefore significantly different from prior stateless Web connections. The connection between Java applet 305, Java server 300 and data repository 110 now resembles a connection between a client machine and a server machine in a client-server environment. Thus, according to this embodiment, decision support tools that require persistent connections can be implemented. By maintaining a persistent connection between the applets on Web browser 100, Java server 300 and data repositories 110, the information necessary to provide complete functionality of the decision support mechanisms can be maintained. This aspect of the present invention is described in further detail below.

Figure 4:
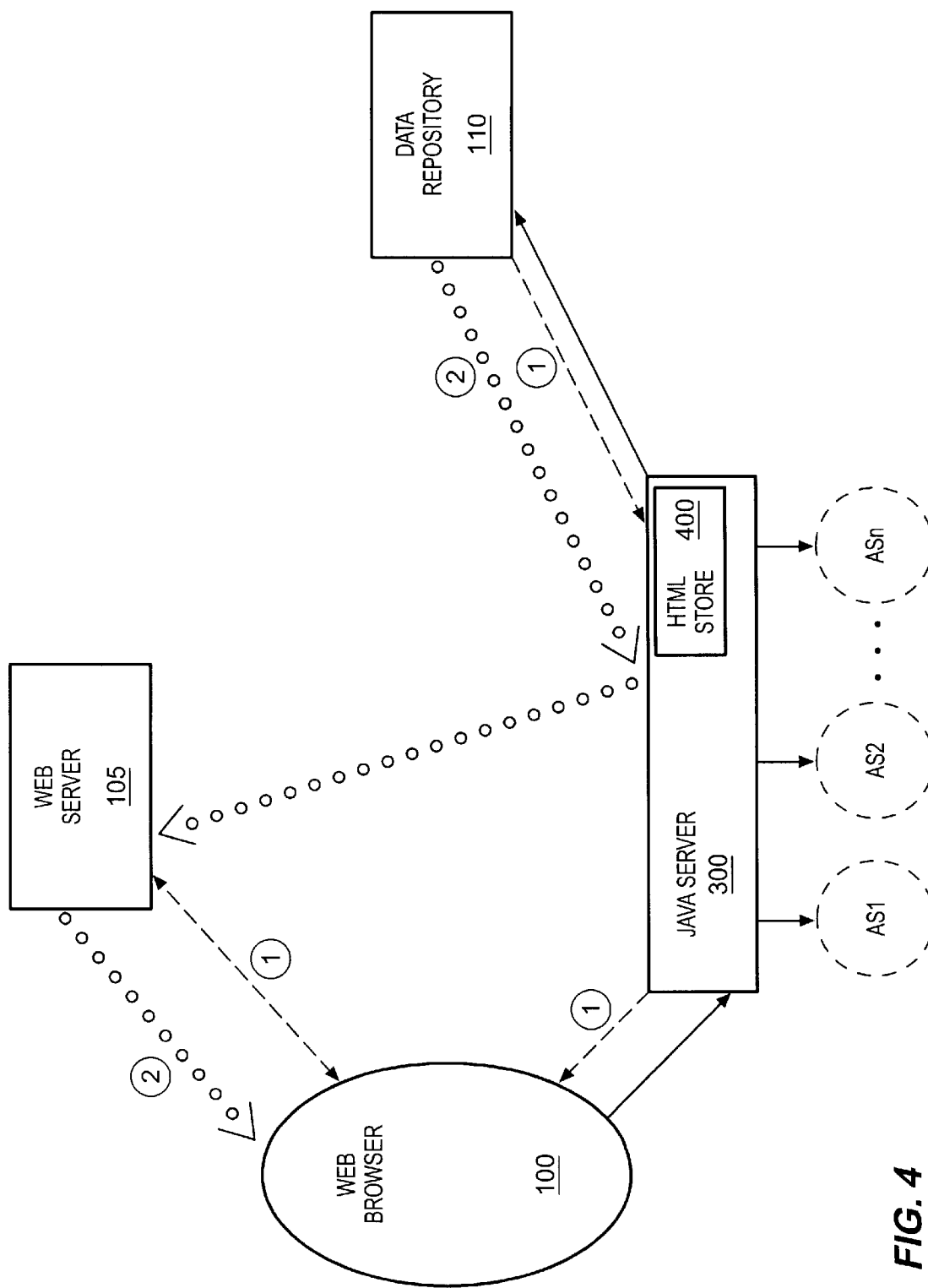
FIG. 4 illustrates two embodiments of the present invention

FIG. 4 illustrates two embodiments of the present invention, each including a different mechanism for displaying the retrieved data. In either embodiment, Web browser 100 connects to Web server 105, and downloads Java applet 305 to Web browser 100. Java applet 305 on Web browser 100 then connects to Java server 300. As illustrated, each Java applet connection to Java server 300 spawns a separate application server (AS). Numerous applications servers are illustrated in FIG. 3. Java applet 305 may, for example, have spawned AS#1 on Java server 300, while other Java applets on Web browser 100 may have spawned the remaining application servers.

Unlike prior art CGI scripts, Java server 300 utilizes threads within the operating system environment rather than processes. As such, a thread within the operating system of Java server 300 runs AS#1, while separate threads run each of the remaining application servers (AS#2–AS#N). After AS#1 has been spawned on Java server 300, based on information from Java applet 305, AS#1 connects to data repository 110.

According to one embodiment of the present invention, data is retrieved from data repository 110 and stored on Java server 300 in HTML store 400. A URL for the HTML store 400 is then sent by AS#1 back to Java applet 305 on Web browser 100. Java applet 305 on Web browser 100 utilizes the URL to connect to Web server 105 to view the HTML formatted data from HTML store 400.

Alternatively, according to another embodiment of the present invention, data is retrieved from data repository 100 via AS#1 and routed to Web server 105. Java applet 305 on Web browser 100 can then view the HTML output directly from Web server 105. In either embodiment, the application server (AS#1–AS#N) on Java server 300 manages the interaction between Java applet 305 on Web browser 100 and data repository 110.

Figure 5A:
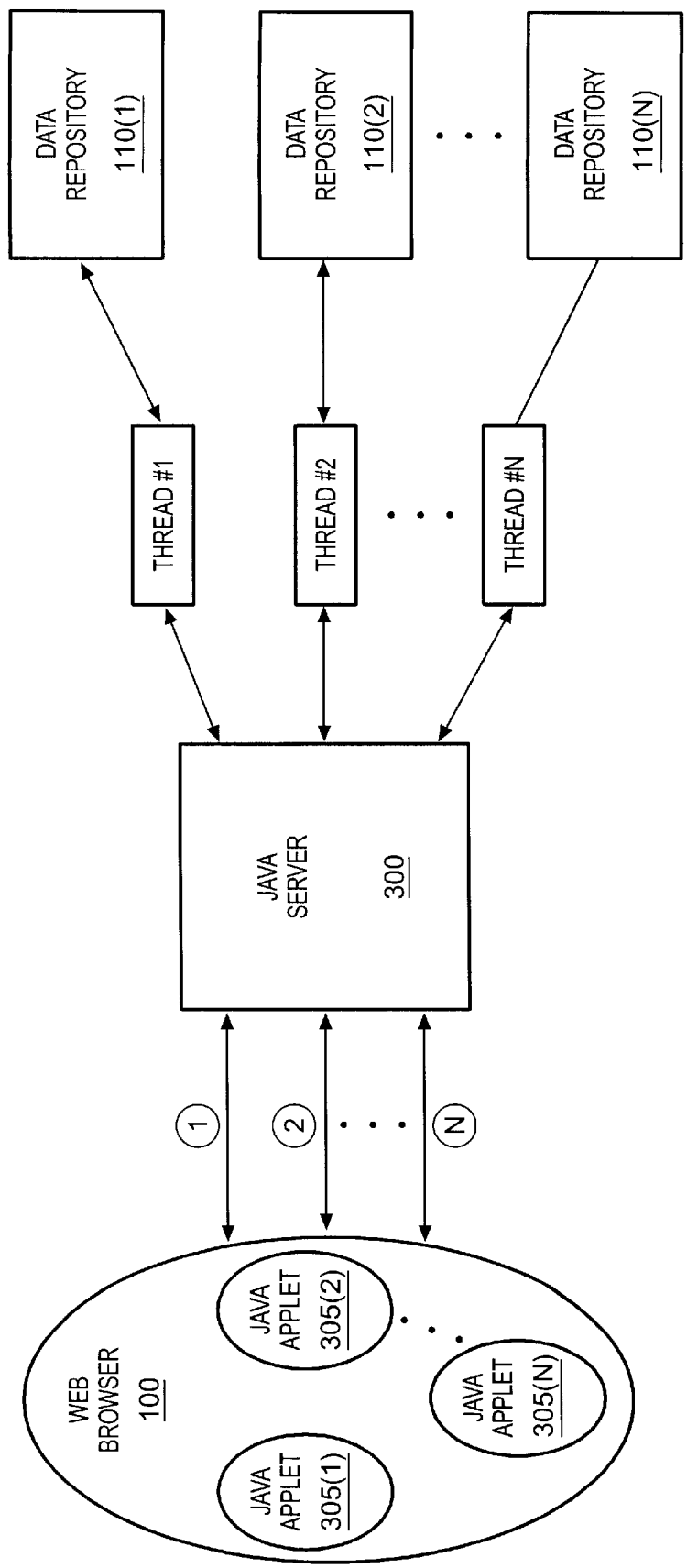
FIG. 5A illustrates the interaction between the Java applet, the Java server and a data repository

FIG. 5A illustrates this interaction between Java applet 305, Java server 300 and data repository 110 in further detail. Specifically, as illustrated, various Java applets (Java applets 305(1)–305(N)) reside on Web browser 100. Each Java applet connects to Java server 300, thus spawning an application server thread. Thus, for example, Java applet 305(1) connects via ;connection #1 to Java server 300, spawning thread (corresponding to AS#1 in FIG. 4) that manages the connection between Java applet 305(1) and data repository 110(1). Similarly, Java applet 305(2) may connect via connection #2 to Java server 300 and spawn thread#2 (corresponding to AS#2 in FIG. 4) that manages the connection between Java applet 305(2) and data repository 110(2).

Figure 5B:
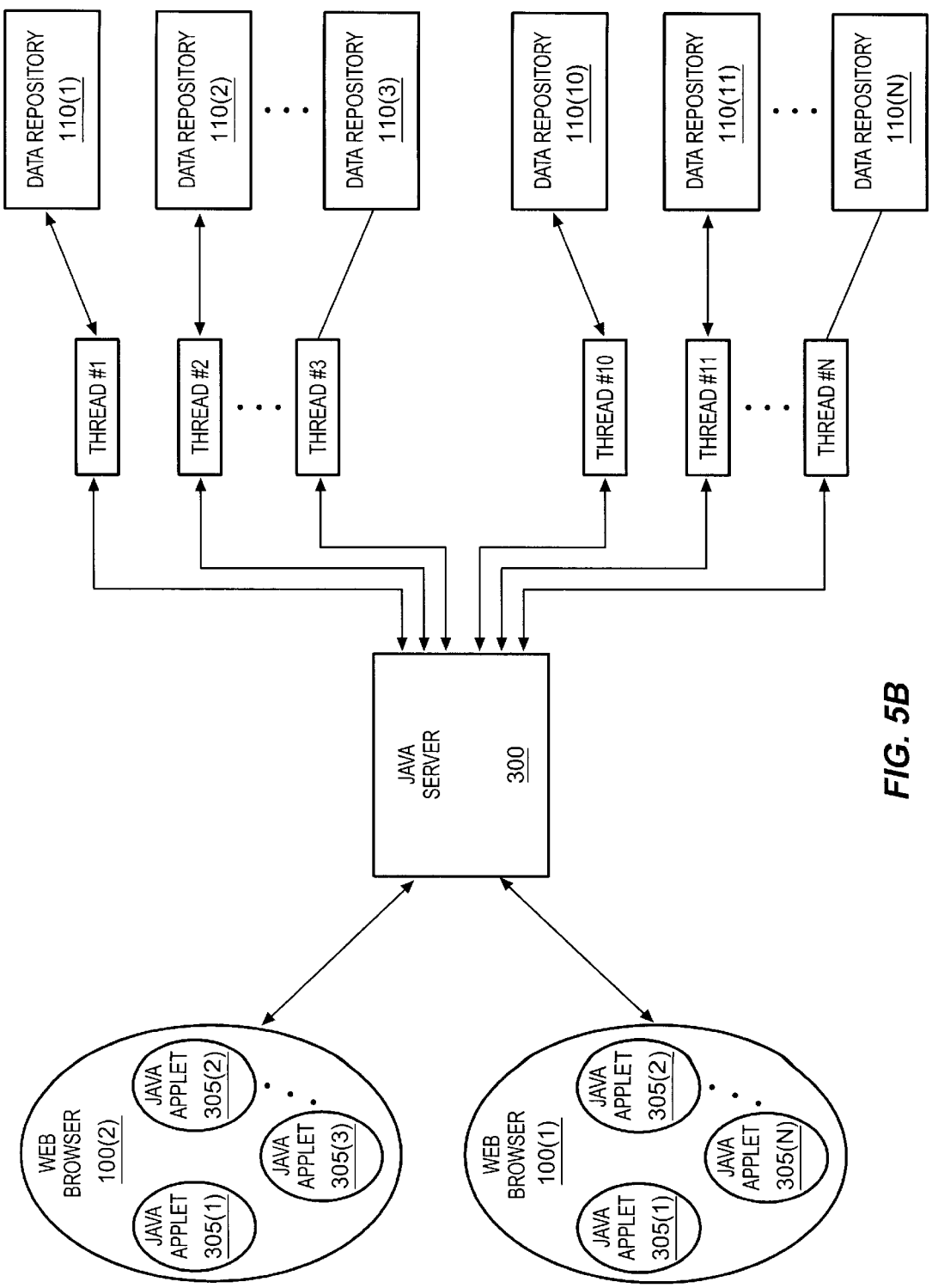
FIG. 5B illustrates an alternative interaction between the Java applet, the Java server and a data repository

FIG. 5B illustrates an alternative embodiment of the interaction between Java applet 305, Java server 300 and data repository 110. Although similar to the embodiment illustrated in FIG. 5A, according to this alternative embodiment, instead of each Java applet on Web browser 100(1) and 100(2) creating and maintaining a separate connection to Java server 300, a single connection is maintained between each of Web browsers 100(1) and 100(2) and Java server 300. Thus, when one of the Java applets, for example Java applet 305(1) on Web browser 100(1), makes a connection request to Java server 300, Web browser 100(1) is connected to Java server 300 and spawns thread#1 to manage the connection between Java applet 305(1) and data repository 110(1).

In this embodiment, however, when Java applet 305(2) or Java applet 305(3) requests a connection to Java server 300, separate connections are not made. Instead, Java applet 305(2) and Java applet 305(3) share the original connection between Web browser 100(1) and Java server 300. The spawning of thread proceeds as originally described in FIG. 5A. Web browser 100(2) makes a similar connection to Java server 300 when one of the applets on Web browser 100(2) makes a connection request to Java server 300. This embodiment enjoys the advantage of utilizing fewer network resources between Web browsers 100(1), Web browser 100(2) and Java server 300 by requiring only a single connection between each Web browser and Java server 300.

Figure 6A:
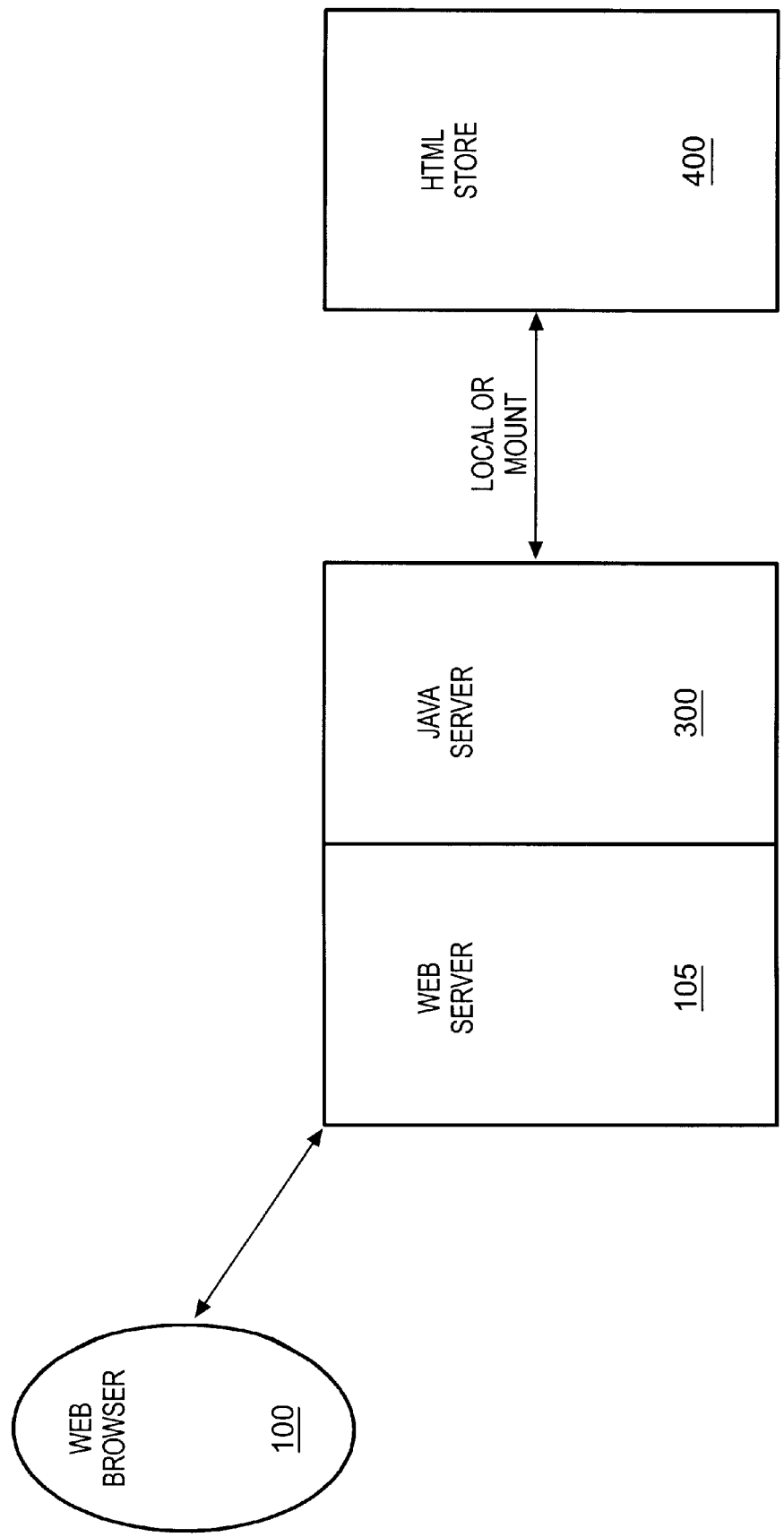
FIGS. 6A–6D illustrate various possible architectures that may be utilized to implement the Java server
Figure 6B:
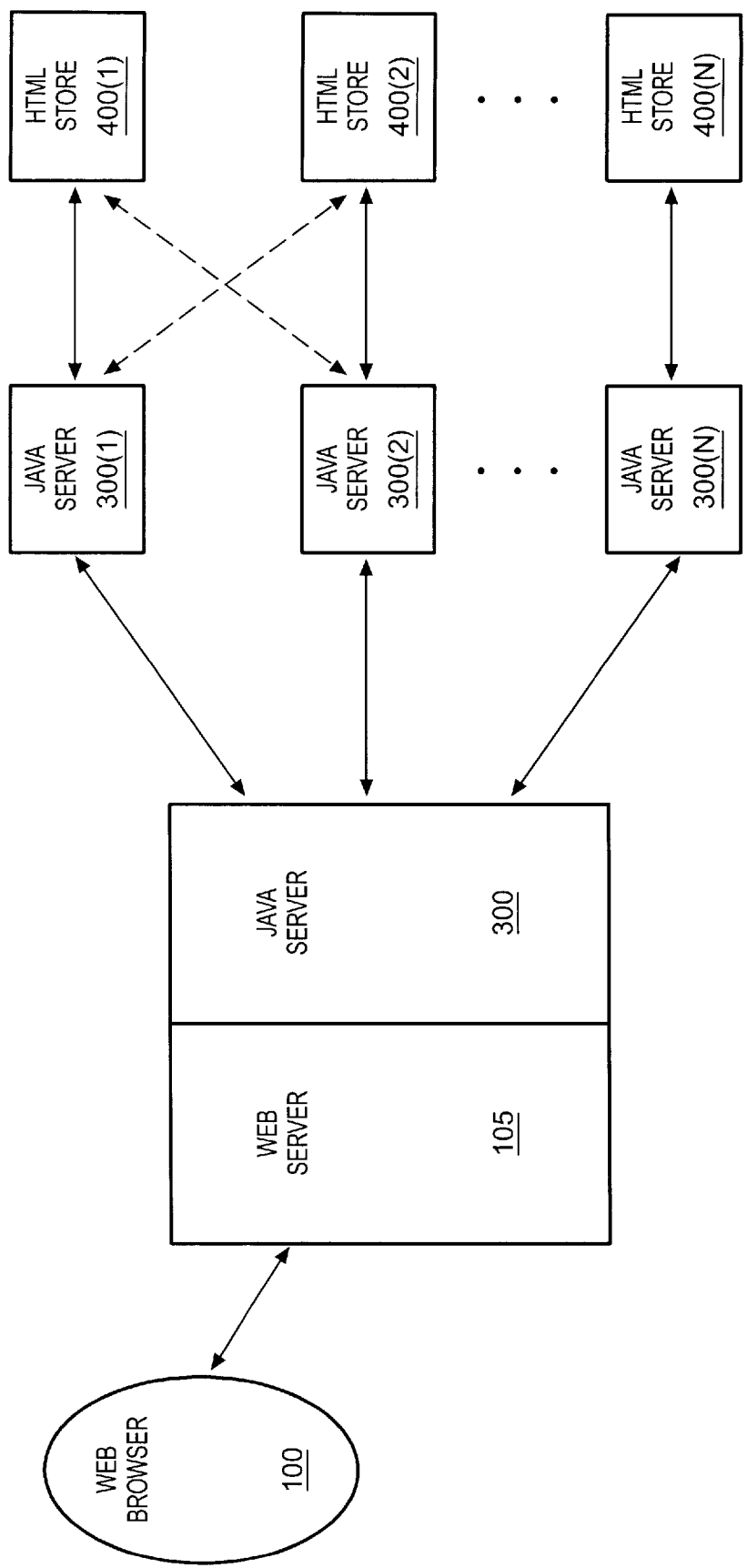
Figure 6C:
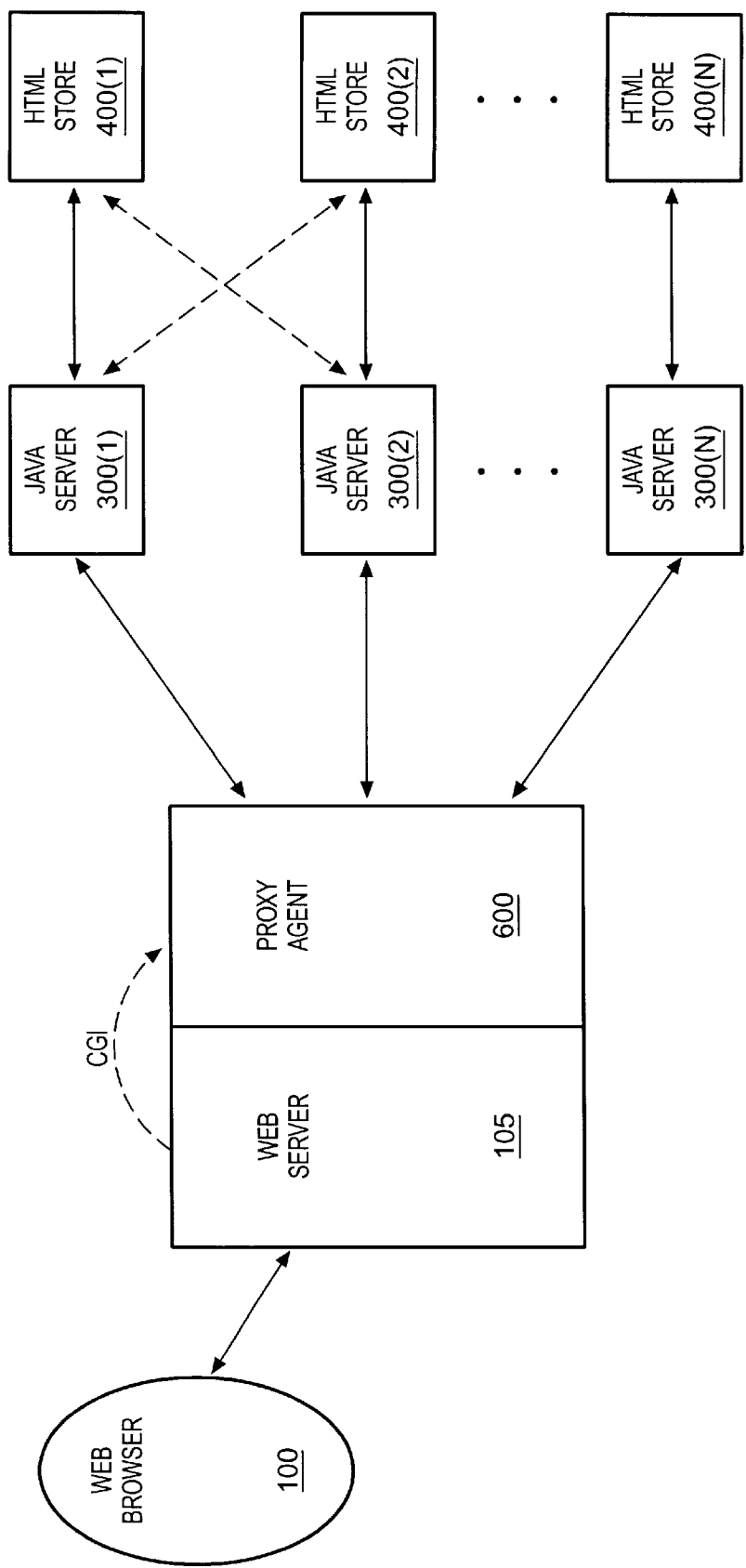

Java server 300 may be implemented in a number of ways. FIGS. 6A–6C illustrate various possible architectures that may be utilized to implement Java server 300. Specifically, FIG. 6A illustrates a scenario wherein Web server 105 and Java server 300 reside on a single machine. According to this embodiment, HTML store 400 may either be a local hard disk on the same machine as Web server 105 and Java server 300, or alternatively, HTML store 400 may be a remote disk that is mountable by the machine on which Web server 105 and Java server 300 reside. For all intents and purposes, a mounted disk is accessible in the same manner as a local disk. An example of mounting technology that may be utilized is Network File System (NFS).

FIG. 6B illustrates an alternative embodiment of Java server 300. According to this embodiment, a Java server 300 still resides on the same machine as Web server 105. When Web browser 100 connects to Web server 105, however, Java server 300 receives requests from Web browser 100 and routes the requests to numerous Java servers on the network. As illustrated, Java server 300 may route requests from Web browser 100 to Java server 300(1)–300 (N). All the Java servers have access to HTML stores 400(1)–400(N) to retrieve HTML data. Java server 300 that receives the requests may thus perform load balancing by routing the requests from Web browser 100 to Java servers that have the appropriate resources available to handle the requests. This embodiment is especially useful to applications developers using Web decision support tools to design applications on a busy network.

FIG. 6C illustrates another embodiment of Java server 300. According to this embodiment, Java server 300 does not reside on the same machine as Web server 105. Instead, according to this illustrated embodiment, when Web browser 100 connects to Web server 105, a CGI script is launched. The CGI script activates proxy agent 600 on the same machine as Web server 105. Proxy agent 600 receives requests from Web browser 100 and routes the requests to numerous Java servers on the network. As illustrated, proxy agent 600 may route requests from Web browser 100 to Java servers 300(1)–300 (N). Each Java server in turn has access to HTML stores 400(1)–400(N) to retrieve HTML data. The proxy agent is not a full blown Java server, as in FIG. 6B, but rather a lightweight agent that simply routes requests. This architecture is thus especially useful to endusers of applications that have been developed using Web decision support tools.

Figure 6D:
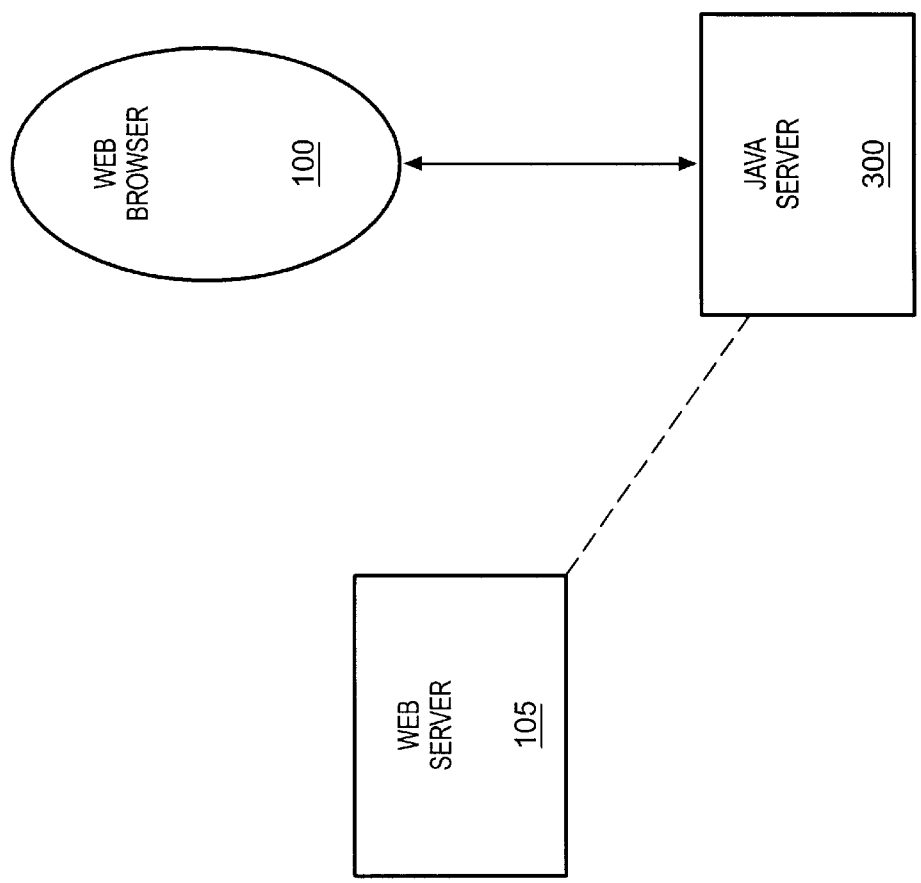

FIG. 6D illustrates yet another embodiment of the present invention. According to this embodiment, Web server 105 is altogether unnecessary. Java server 300 may be designed to support HTTP directly and as such, Web browser 100 may connect directly to Java server 300 and download a Java applet from Java server 100 to Web browser 100. The Java applet then interacts with Java server 100 and data repository 110.

As described above, by maintaining a persistent connection between the applets on Web browser 100, Java server 300 and data repositories 110, the information necessary to provide complete functionality of decision support mechanisms can be maintained. Thus, for example, if a decision support tool is created as a Java applet 305, the tool now has the ability to perform all the functions of prior art decision support tools. Additionally, Java applet 305 may also provide users with added functionality that is not available in prior art decision support tools.

Most importantly, by utilizing Java applets as described above to distribute decision support tools, these tools are now available to a user anywhere, i.e. the user is no longer tied to a particular machine or a particular location, as is a user in a client-server environment. In the client-server environment, even if a user is carrying a portable PC, for example, he or she may not have the appropriate decision support tool installed on the machine. Additionally, if the user requires multiple tools, each tool must be separately installed on the portable PC.

By creating decision support tools for the Web as Java applets, according to one embodiment of the present invention, a user no longer has to be concerned with installation of tools on a machine. Thus, in the above example of a user with a portable PC, the user simply has to install a Web browser on the portable PC. Once the Web browser is installed, the user has access from any remote location to a variety of decision support tools.

According to one embodiment of the present invention, the applications servers (AS#1–AS#N) illustrated in FIG. 4 above implement the formatting functions described below. In one embodiment, the applications servers retrieve data from data repository 110 and store them as HTML formatted documents either locally or on a mounted volume. A URL for the HTML formatted document is then sent by the application server back to Java applet 305 on Web browser 100. Java applet 305 on Web browser 100 utilizes the URL to connect to Web server 105 to view the HTML formatted data. Alternatively, according to an alternate embodiment, data is retrieved from data repository 100 via an application server and routed to Web server 105. Java applet 305 on Web browser 100 can then view the HTML formatted document directly from Web server 105.

The application servers according to these embodiments is independent of Java server 300. As such, although Java server 300 spawns the application servers, once the threads have been spawned, Java server 300 does not interfere with the application servers. This architecture is significantly different from prior architectures such as NSAPI and ISAPI wherein the APIs are extensions of Web server 105 and provide only limited functionality. In the present architecture, the application servers are simply threads on the Java server and are not tied to any particular Web server. Each application server may be configured to perform extensive tasks, i.e. the set of tasks that the application server may perform is not limited by an API on the Web server.

Additionally, the application servers are designed to take advantage of HTML to perform formatting functions. Standard client-server based tools have to be programmed to handle all aspects of formatting the visual layouts of user queries. In addition to the overhead of programming all layout functions, the tools were proprietary, e.g. a Microsoft Windows 3.1 tools required a Microsoft Windows 3.1 client machine in order to display queries.

In contrast, with the use of the application servers described above, Web based decision support tools can take advantage of standard HTML formatting capabilities, thus significantly extending the formatting capabilities of the Web tools without any effort on the part of the Web tool developer. Given that HTML is supported by all Web browsers, the use of HTML formatting allows the tools to provide visual displays on any HTML compliant Web browser. The application servers therefore provide Web decision support tools with an extremely flexible and robust development environment that could not be achieved via prior art mechanisms.

Thus, given the flexibility of the application servers, according to one embodiment of the present invention, Web based decision support tools may now support the formatting and display of standard reports such as tabular reports, break reports, drill-down reports, master-detail reports, form reports, comma separated value (CSV) reports, and mail label reports. Most of these formats were supported in traditional client-server environments, but could not be achieved on the Web due to the stateless connections on the Web, as described above. In addition, as described above, these formats now take advantage of HTML to allow for viewing from any HTML compliant Web browser.

According to one embodiment of the present invention, new report formats are also supported by Web based decision support tools. These report formats take full advantage of the architecture of Java server 300 described above to present the user with added functionality over existing client-server decision support tools. The added reporting formats include a chart format, drill-down chart format, and a publishing format. The publishing format in turn includes two options: the compound option and the frame option. Each of the new formats is described in further detail below.

Figure 7A:
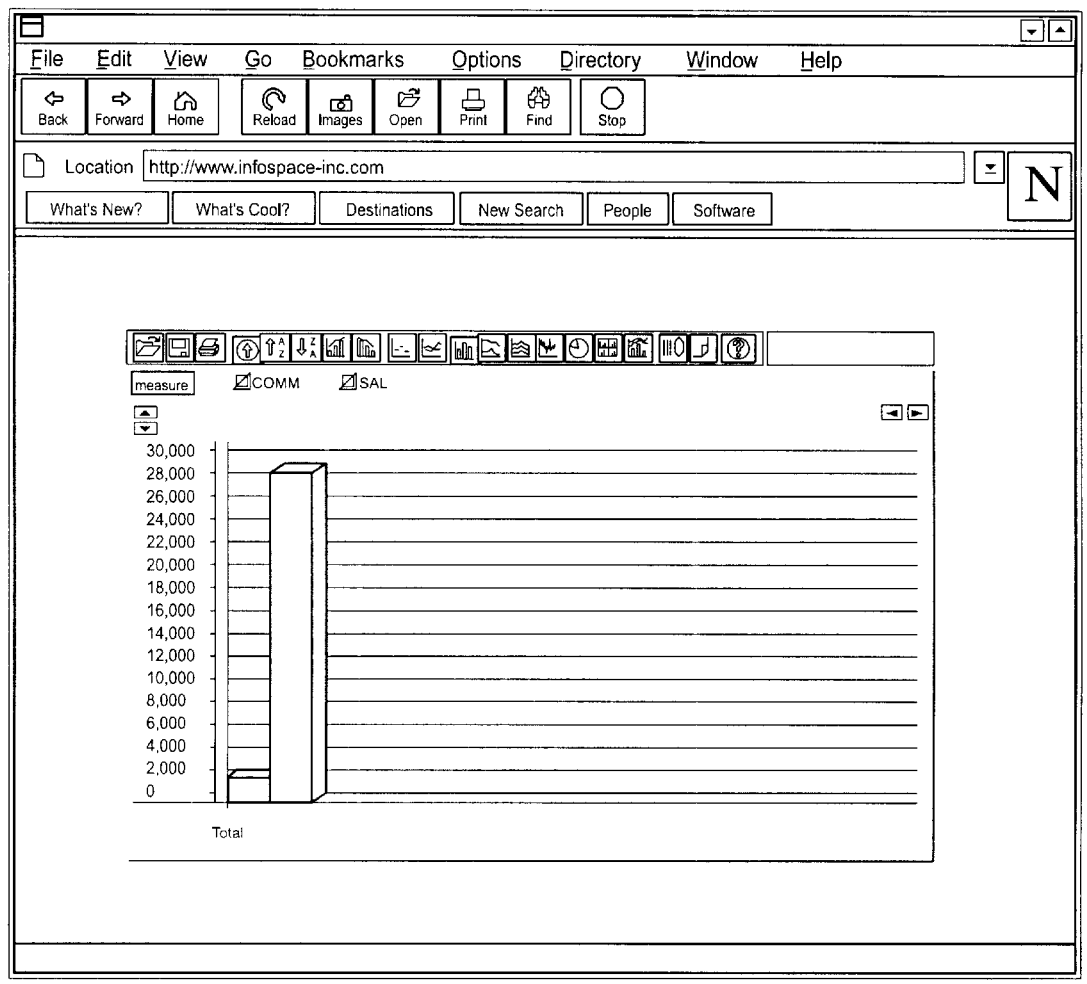
FIGS. 7A–7B illustrate the chart and drill-down chart formats of reports
Figure 7B:
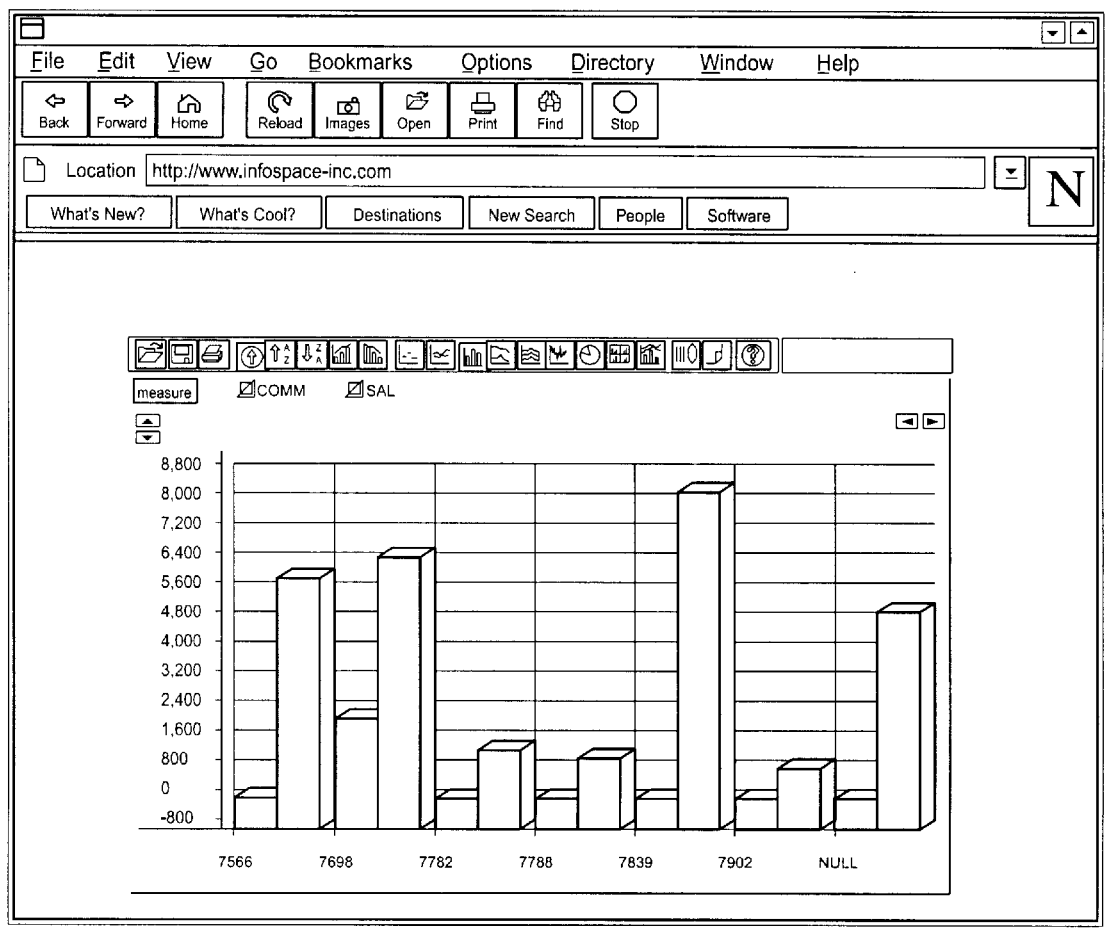

FIGS. 7A–7B illustrate the chart and drill-down chart formats of reports. As illustrated in FIG. 7A, a user may create a report on the Web that is formatted as a chart. The chart in the report may be a 2-dimensional or a 3-dimensional chart that the user can manipulate in order to better represent the data that the report is displaying. The illustrated chart is a 2-dimensional chart that shows total compensation for a corporation, broken down by commissions and salaries.

FIG. 7B illustrates one of the manipulations that the user may perform, namely a changing from a chart format to a drill-down chart format. As illustrated, the drill-down chart allows the user to click on a the total compensation bars of FIG. 7A to have the information presented in further detail. In the illustrated example, the user clicks on the total compensation bars in the chart of FIG. 7A and the bar is broken down into compensation by department. Thus, the user is able to instantly view the breakdown of the compensation and determine, for example, the amount of compensation for department 7566. The user may also drill-up, i.e. click on any of the bars in FIG. 7B to return to the total compensation bar of FIG. 7A. This ability to drill-down and drill-up in a graphical representation of data is a significant feature that greatly enhances the use of a decision support tool.

Figure 8A:
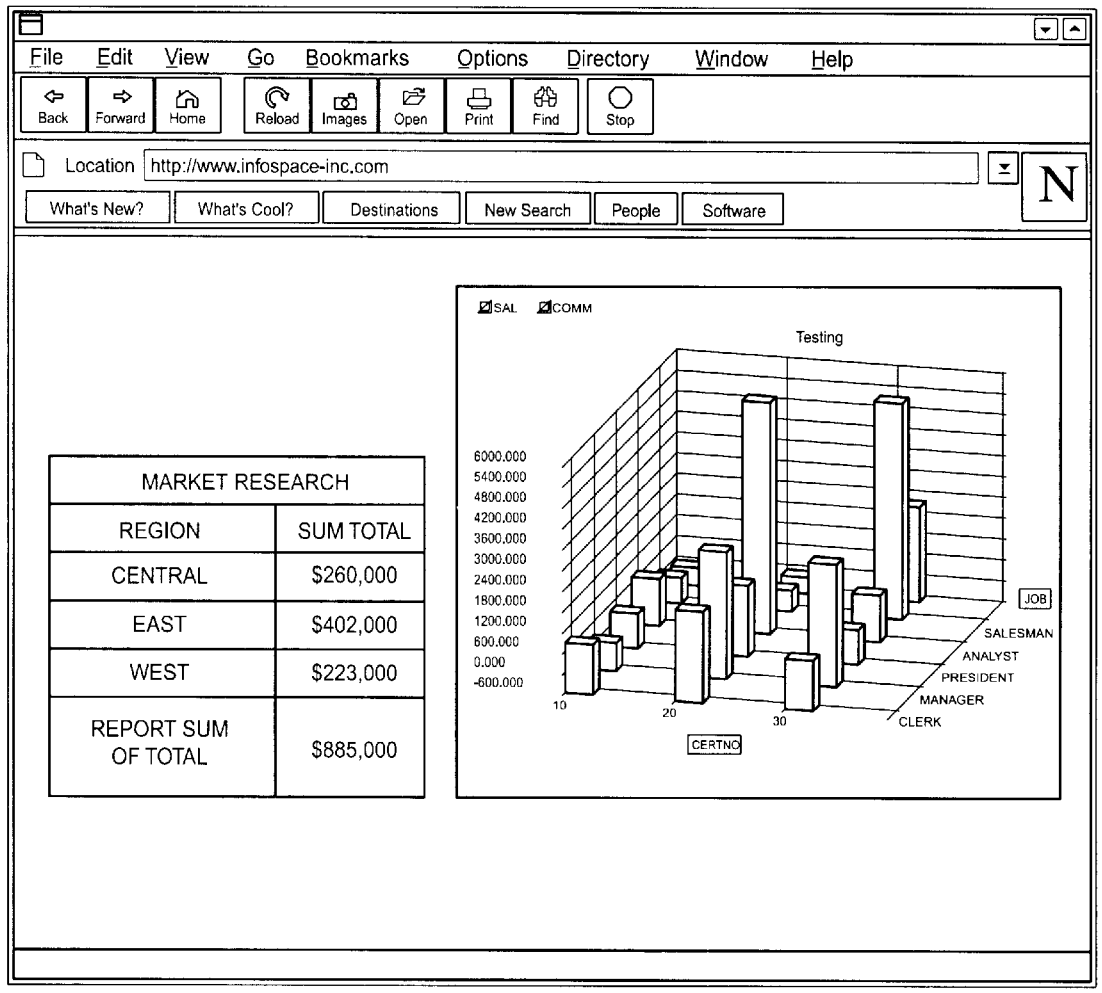
FIGS. 8A–8B illustrate the publishing format according to one embodiment of the present invention
Figure 8B:
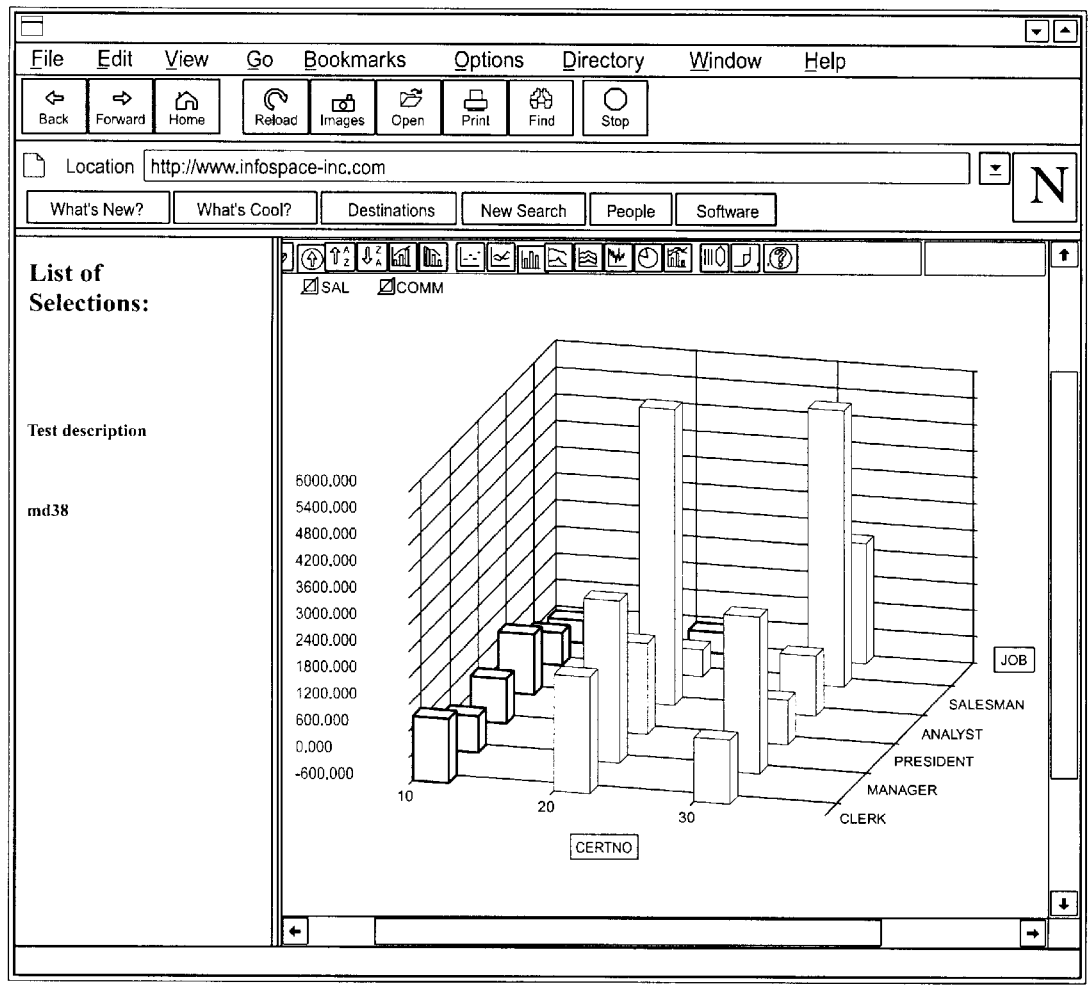

FIGS. 8A–8B illustrate the publishing format according to one embodiment of the present invention. Specifically, FIG. 8A illustrates the compound option of the publishing format. As illustrated, the compound option allows a user to specify multiple reports and a format for the display of the multiple reports on a single page. Thus, for example, as illustrated in FIG. 8A, two different formats of reports are presented to a user on a single page, namely a tabular format and a chart format. This allows the user to view the same data in multiple different graphical representations. Alternatively, the compound format also allows a user to display data from different sources concurrently, thus allowing the user to visually examine the different data on the same page.

FIG. 8B illustrates the frame option of the publishing format. As illustrated, the frame option allows the user to be presented with a list of formats in which a report can be displayed. When the user selects a format from the list of formats, the report is displayed in an adjacent frame in the selected format. This allows users to move between formats of reports quickly, thus enabling efficient viewing of relevant data in a useful format. In the illustrated example, a chart report is highlighted and a corresponding chart is displayed in the adjacent frame.

Figure 9:
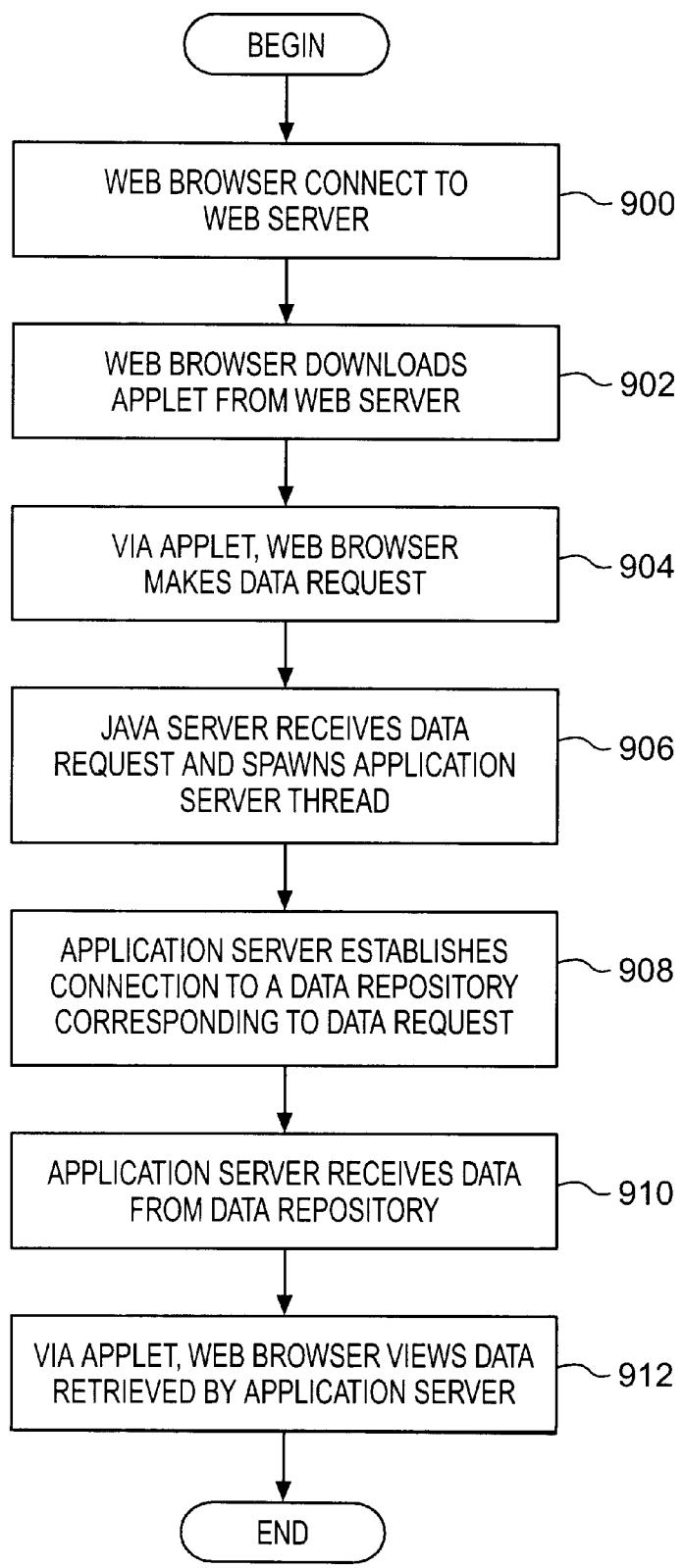
FIG. 9 is a flow chart illustrating an embodiment of the present invention

FIG. 9 illustrates a flow chart of one embodiment of the present invention. In step 900, a Web browser connects to a Web server. The Web browser downloads an applet from the Web server in step 902. In step 904, the Web browser makes a data request via the applet. A Java server receives the data request and spawns an application server thread in step 906. In step 908, the application server establishes a connection to a data repository corresponding to the data request. The application server retrieves data from the data repository in step 910. Finally, in step 912, the Web browser, via the applet, views the data retrieved by the application server.

FIG. 10 illustrates a flow chart of another embodiment of the present invention. In step 1000, a Java server receives a data request from a decision support tool on a Web browser. The Java server spawns an application server thread in step 1002, and establishes a connection to a data repository corresponding to the data request in step 1004. In step 1006, the application server retrieves data from the data repository. The application server then formats the retrieved data into one or more of the supported reporting formats in step 1008. At that point, the application server may do one of the following. The application server may perform step 1010 and return the formatted data to the Web browser directly via the Web server. Alternatively, the application server may store the formatted data in an HTML store in step 1012, send a URL for the HTML store to the Web browser in step 1014 and allow the Web browser to use the URL to view the formatted data in step 1016.

Thus, a method and apparatus for formatting and displaying data on the Web is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular embodiment, it should not be considered so limited. Rather, the present invention is limited only by the scope of the appended claims.

What is claimed is:

1. A computer-implemented method for formatting and displaying data on the World Wide Web (the web), the method comprising:

receiving a request on an application server from a Web client;

establishing a connection from the application server to a data repository;

retrieving the data from the data repository, receiving formatting specification from the Web client;

formatting the data on the application server in a predetermined reporting format, wherein formatting further includes examining the formatting specification to determine a type of report corresponding to the predetermined reporting format; and formatting the data according to the type of report wherein the type of format is one of a tabular format, a break report format, a drill-down report format, a master-detail report format, a form report format, a chart report format, a drill-own chart report format or a publishing report format.

2. The computer-implemented method according to claim 1 wherein the publishing report format includes a compound option and a frame option.

3. The computer-implemented method according to claim 2 wherein the compound option displays multiple reports in multiple report formats on a single layout.

4. The computer-implemented method according to claim 2 wherein the frame option includes a list of multiple reports having multiple formats, and a display of a report from the list of multiple reports.

5. A computer-implemented method for formatting and displaying data on the World Wide Web (the web), the method comprising:

receiving a request on an application server from a Web client;

establish an application thread from the application server to a data repository, maintaining a persistent state connection between the Web client and the data repository via the application server;

retrieving the data from the data repository;

receiving formatting specifications from the Web client;

formatting the data on the application server in a predetermined reporting format, wherein formatting further includes examining the formatting specification to determine a type of report corresponding to the predetermined reporting format, and formatting the data according to the type of report; and displaying the formatted data on a display coupled to the Web client, wherein the type of format is one of a tabular format, a break report format, a drill-down report format, a master-detail report format, a form report format, a chart report format, a drill-down chart report format or a publishing report format.

6. The computer-implemented method according to claim 5 wherein the publishing report format includes a compound option and a frame option.

7. The computer-implemented method according to claim 6 wherein the compound option displays multiple reports in a multiple report formats on a single layout.

8. The computer-implemented method according to claim 6 wherein the frame option includes a list of multiple reports having multiple formats, and a display of a report from the list of multiple reports.

9. A machine-readable medium having stored thereon data representing sequences of instructions, the sequences of instructions which, when executed by a processor, cause the processor to:

receive a request on an application server from a Web client;

establish a connection from the application server to a data repository;

retrieve the data from the data repository;

receive formatting specifications from the Web client;

format the data on the application server in a predetermined reporting format by examining the formatting specification to determine a type of report corresponding to the predetermined reporting format and formatting the data according to the type of report; and display the formatted data on a display coupled to the Web client, wherein the type of format is one of a tabular format, a break report format, a drill-down report format, a master-detail report format, a form report format, a chart report format, a drill-down chart report format or a publishing report format.

10. The medium of claim 9 wherein the publishing report format includes a compound option and a frame option.

11. The medium of claim 10 wherein the compound option displays multiple reports in a multiple report formats on a single layout.

12. The medium of claim 11 wherein the frame option includes a list of multiple reports having multiple formats, and a display of a report from the list of multiple reports.

\* \* \* \* \*